United States Patent
Sakamoto et al.

(10) Patent No.: US 6,397,688 B1
(45) Date of Patent: Jun. 4, 2002

(54) SEATING LOAD DETECTING DEVICE WITH BRACKET MOUNTED SENSOR

(75) Inventors: Kazunori Sakamoto, Chiryu; Yoshisaburo Todo, Chofu; Makoto Hamada, Toyota; Osamu Fujimoto, Nisshin, all of (JP)

(73) Assignees: Aisin Seiki Kabushiki Kaisha, Kariya; Kyowa Electronic Instruments Co., Ltd., Chofu, both of (JP)

(*) Notice: Subject to any disclaimer, the term of this patent is extended or adjusted under 35 U.S.C. 154(b) by 0 days.

(21) Appl. No.: 09/665,659

(22) Filed: Sep. 20, 2000

(30) Foreign Application Priority Data

Sep. 24, 1999 (JP) .............................. 11-270080

(51) Int. Cl.⁷ ................................. G01L 1/04
(52) U.S. Cl. ................................. 73/862.637
(58) Field of Search .................. 73/862.391, 862.451, 73/862.471, 862.521, 862.636, 862.637; 177/136; 296/65.01

(56) References Cited

U.S. PATENT DOCUMENTS 4,488,754 A * 12/1984 Heesh et al. ............... 297/216
6,069,325 A * 5/2000 Aoki ............................ 177/136
6,161,891 A * 12/2000 Blakesley .................. 296/65.01
6,176,543 B1 * 1/2001 Nawata et al. ............. 296/189
6,231,076 B1 * 5/2001 Blakesley et al. .......... 280/735

FOREIGN PATENT DOCUMENTS

| JP | 11-1153 | 1/1999 |
| JP | 11-1154 | 1/1999 |
| JP | 11-94637 | 4/1999 |
| JP | 11-108746 | 4/1999 |

* cited by examiner

*Primary Examiner*—Max Noori
(74) *Attorney, Agent, or Firm*—Burns, Doane, Swecker & Mathis, LLP

(57) ABSTRACT

A seating load detecting device in which a lower arm for supporting a seat cushion and a seat back is coupled with an upper rail by a front bracket and a rear bracket. A distortion gage is attached to the bracket. The bracket comprises a curved portion of a U-shape or V-shape. The lower arm and the upper rail are coupled to each other with the direction orthogonal to two opposing legs of the curved portion being vertical. The distortion gage has a total of four distortion detecting elements $G_{11}$ to $G_{22}$ distributed in a matrix distribution, two attached in the front and back directional plane of the legs and two attached in the width directional plane of the legs. Due to the Wheatstone bridge connection line of these elements, high gain of a seating load detection voltage e with respect to the amount in change of the vertical load Fv can be obtained.

21 Claims, 8 Drawing Sheets

FIG.4B
FIG.4A
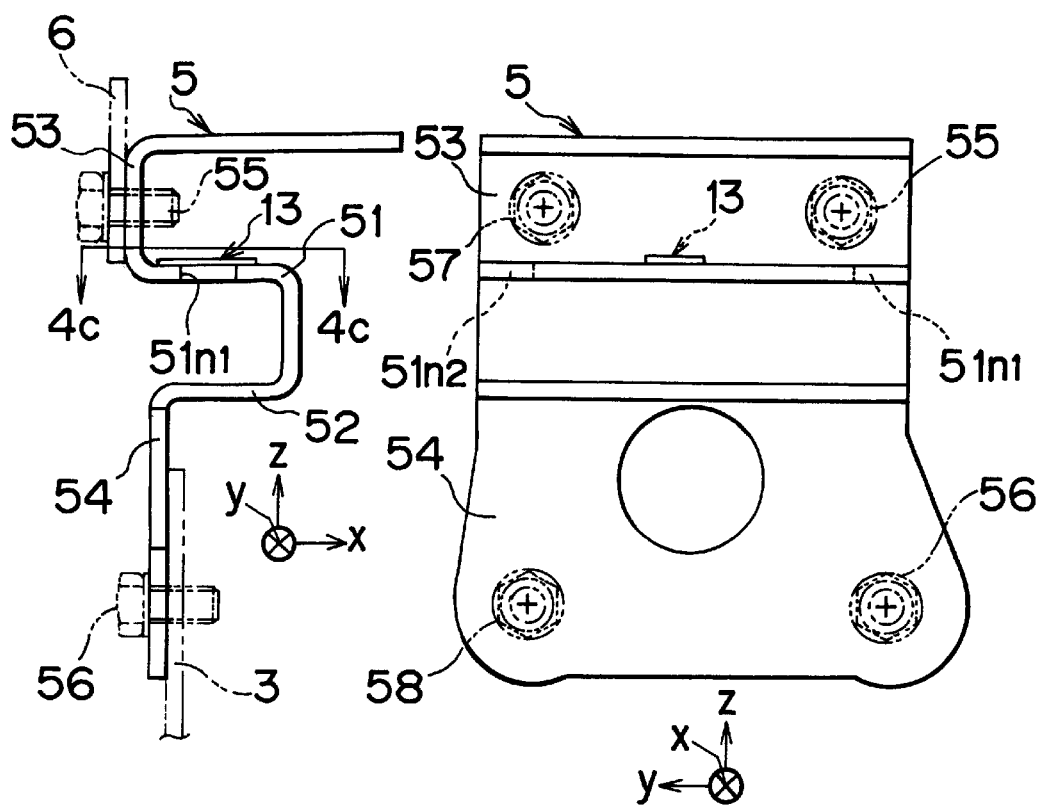
FIG.4C
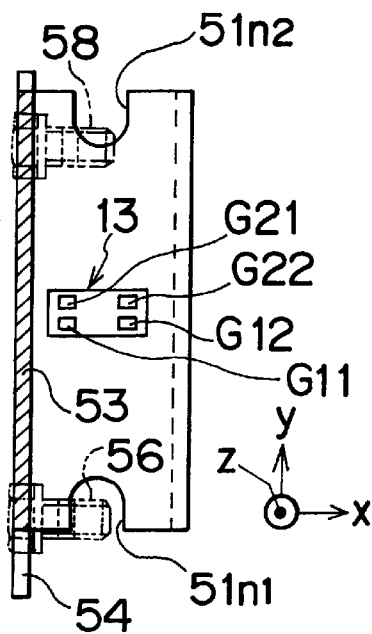

Fv DISTORTION WHEN LOAD IS APPLIED

Fh DISTORTION WHEN LOAD IS APPLIED

SEATING LOAD DETECTING DEVICE WITH BRACKET MOUNTED SENSOR

BACKGROUND OF THE INVENTION

1. Field of the Invention

The present invention relates to seating load detection of a seat, which fixes members for supporting a seat cushion and a seat back on a floor by positioning members. More particularly, the present invention relates to seating load detection of a seat arranged in a vehicle without being limited thereto.

2. Description of the Related Art

For example, when an air bag to protect a passenger who is seated in a seat is provided in a vehicle, a seating load detecting device is attached to the seat of the vehicle in order to detect whether or not a passenger is seated in that seat, or in order to properly adjust a gas generating amount for blowing out the air bag according to the passenger's weight. Japanese Patent Application Laid-Open No. HEI 11-1153 discloses an embodiment in which a load cell is disposed between a rail, which slidably guides a vehicle seat in the backward and forward direction of vehicle advancement, and a mount bracket which fixedly supports the rail to the vehicle floor, so as to detect the seat weight with this load cell. Japanese Patent Application Laid-Open No. HEI 11-1154 discloses a passenger detecting device in which a link assembly for measuring a seat cushion weight is interposed between a frame for supporting a seat cushion and the seat cushion, such that the seat cushion load is applied to a load cell by rotation of the link using a supporting point. Further, Japanese Patent Application Laid-Open No. HEI 11-94637 discloses a passenger detecting device in which a link assembly for measuring a seat cushion weight is interposed between a slide rail to be guided by a rail fixed to the vehicle floor and a seat cushion, such that the seat cushion load is applied to the load cell by rotation of the link using a supporting point.

With respect to the weight measuring mechanism in the above mentioned Japanese Patent Application Laid-Open No. HEI 11-1153, the load cell is mounted on the mount bracket and the guide real is further mounted on the load cell. Therefore, it appears easy to obtain such a mechanism; however, the realization thereof is in fact difficult. The vehicle seat must be strongly fixed to the vehicle floor and interposing a load cell between the mount bracket and the guide rail greatly reduces the seat supporting strength in both the vertical and horizontal directions. The mount bracket is designed differently for different types of vehicles such that the vehicle seat can be commonly used in a wide variety of vehicles. In this case, load cell standards and installation must be adjusted for each type of vehicle, which makes it difficult to lower the cost of the weight measuring device.

With respect to the weight measuring mechanism disclosed in the above mentioned Japanese Patent Application Laid-Open No. HEI 11-1154 and Japanese Patent Application Laid-Open No. HEI 11-94637, since the seat cushion is supported by a link mechanism for measuring the weight, the seat cushion can move vertically by a corresponding amount. Therefore, the seat cushion loses its inherent rigidity which is an important feature of a vehicle seat. Since the link mechanism is complicated and occupies a large space, the design of the vehicle seat must be largely modified. In the above mentioned Laid-Open Patent Publication No. HEI 11-94637, the link mechanism reacts individually in response to a front load and a back load of the seat cushion, so that it is impossible to detect the mass which escapes to the seat back. As a result, superior accuracy of detection cannot be expected.

SUMMARY OF THE INVENTION

In view of the foregoing problems, it is an object of the present invention is to provide a seating load detecting device, which is capable of being provided to a seat without greatly changing the original shape of the seat, improve the stability and the accuracy in seating load detection, and prevent deterioration of seat stability and comfort with the incorporation of a load detecting mechanism.

A seating load detecting device according to a first aspect of the present invention comprises a bracket for coupling a seating load supporting member to support a seat cushion and a seat back with a positioning member to position the seat on a floor, which elastically transmits the load applied on the seating load supporting member to the positioning member. The bracket is provided with a curved portion having opposing portions between the positioning member and the seating load supporting member. The bracket connects the seating load supporting member and the positioning member with a connecting portion extending vertically from the opposing portions, and is further provided with a load sensor at those opposing portions. Accordingly, distortion is generated in the bracket by a load on the seating load supporting member. However, since this distorts the shape of the bracket only slightly, the mechanism does not move substantially. The bracket only needs to be large enough to couple the seating load supporting member with the positioning member, with space for arranging a load sensor. Accordingly, it is not necessary to modify the original shape of the seat. Since the load sensor is disposed on the bracket and there is no movement mechanism such as a link for measuring weight, it is possible to improve the stability and the accuracy of the seating load detection, while maintaining the stability and comfort of the seat.

The curved portion has a spring function due to its rigidity. When a person sits on the seat cushion, the curved portion deforms such that the opposing portions of the curved portion become closer together. The load sensor responds to this change in the shape of the opposing portions. Since the curved portion easily expands and contracts in response to the load, the stability and the accuracy in the seating load detection is high. Further, since the displacement of the curved portion is a spring displacement, stability and comfort of the seat is not lost.

According to the foregoing aspect of the present invention, the shape of the curved portion is either generally U-shaped or V-shaped, such that the space between opposing portions within the curved portion narrows as the amount of the seating load increases.

Further, according to the foregoing aspect of the present invention, the space between opposing portions within the curved portion is adjusted so as to become narrower by applying a pre-load in the vertical direction.

According to this arrangement, it becomes possible to decrease the rigidity of the curved portion and increase the sensitivity of the seating load detection. Due to the seating load, the space between the opposing portions of the curved portion becomes narrow. Therefore, the stroke, i.e., the space between opposing portions, from a point where the opposing portions narrows by applying the seating load to a point where the end of the opposing portions contact each other, becomes short and the relatively light load allows the opposite portion's edges to contact each other. As a result, a large distortion is not applied to the portion, which is provided with the load sensor, so that damage to or distortion of the bracket or the load sensor can be prevented.

A seating load detecting device according to a second aspect comprises a bracket for coupling a seating load supporting member to support a seat cushion and a seat back with a positioning member to position a seat on a floor to elastically transmit the load applied on the seating load supporting member to the positioning member. The bracket is provided with a load sensor. A limiting member which limits the moving amount in the vertical direction of the seating load supporting member when the load acts on the seating load supporting member is provided between the bracket or the seating load supporting member and the positioning member.

The application of excessive impact changes the shape of the curved portion or the bracket. According to this change of shape, the posture of the seat loses its figure. The above limiting member allows the amount for the shape change of the bracket to remain under a predetermined amount.

According to the second aspect, the limiting member is provided with a long hole in the vertical direction. The limiting member is fixed on any one side of the seating load supporting member or the positioning member and a protrusion which is movable within the long hole is provided on the other side, so that the vertical movement of the seating load supporting member is limited by a long hole.

According to the first and second aspects, the load sensor comprises a distortion gage. Accordingly, the bracket only needs to be large enough to couple the seating load supporting member with the positioning member and space for attaching a distortion gage, so it is not necessary to change the original shape of the seat. Since the distortion gage is integrated with the bracket and there is no movement mechanism, it is possible to improve the stability and accuracy of the seating load, while maintaining the stability and comfort of the seat. The curved portion has a spring function due to its rigidity. When a person sits on the seat cushion, the curved portion changes so that the opposing portions of the curved portion become close to each other and the distortion gage responds to the distortion of the opposing portions.

The object and the features of the present invention will become clear according to the description of the following embodiments with reference to the drawings.

BRIEF DESCRIPTION OF THE DRAWINGS

FIG. 4A is an enlarged front view of the rear bracket shown in FIG. 2;

FIG. 4B is an enlarged right side view of the rear bracket shown in FIG. 2;

FIG. 4C is an enlarged bottom view of the rear bracket shown in FIG. 2;

DESCRIPTION OF THE PREFERRED EMBODIMENTS

The respective embodiments of the present invention will hereinafter be described in detail with reference to the drawings.

Figure 1:
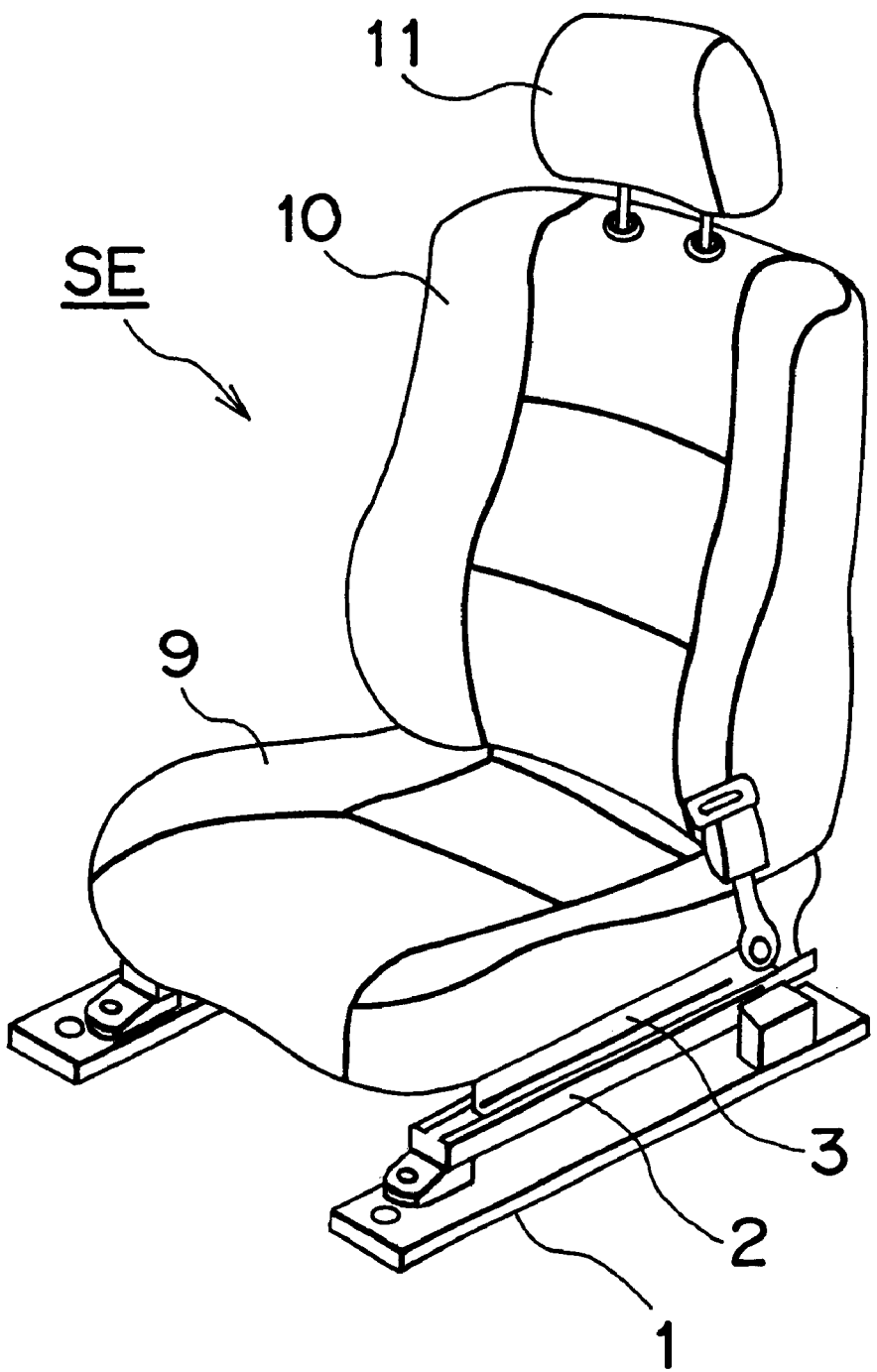
FIG. 1 is a perspective view showing an appearance of a vehicle seat, which is provided with a seating load detecting device according to a first embodiment of the present invention.

FIG. 1 shows an appearance of an embodiment of the present invention. In the embodiment shown in FIG. 1, a mount bracket supporting frame 1 is fixed to a vehicle floor. On a mount bracket fixed by this frame 1, a fixing guide rail 2 is fixed. An upper rail 3 as a slide rail is mounted slidably on the fixing guide rail 2 in a direction in which the fixing guide rail 2 extends, i.e., the direction of the front and back progression of the vehicle (hereinafter referred as to the front and back direction). There are provided a slide engaging mechanism and an engaging release lever or the like for adjusting the position in the front and back direction of a seat SE. The person who sits in the seat operates the engaging release lever to release the engagement and moves a seat SE slidably in the front and back direction, such that the person can adjust the position in the front and back direction of the seat SE, i.e., the front and back position of the seat SE. This arrangement is not illustrated by the drawings. An upper rail 3 is coupled with a lower arm 6, which supports a seat cushion 9 and a seat back 10.

Figure 2:
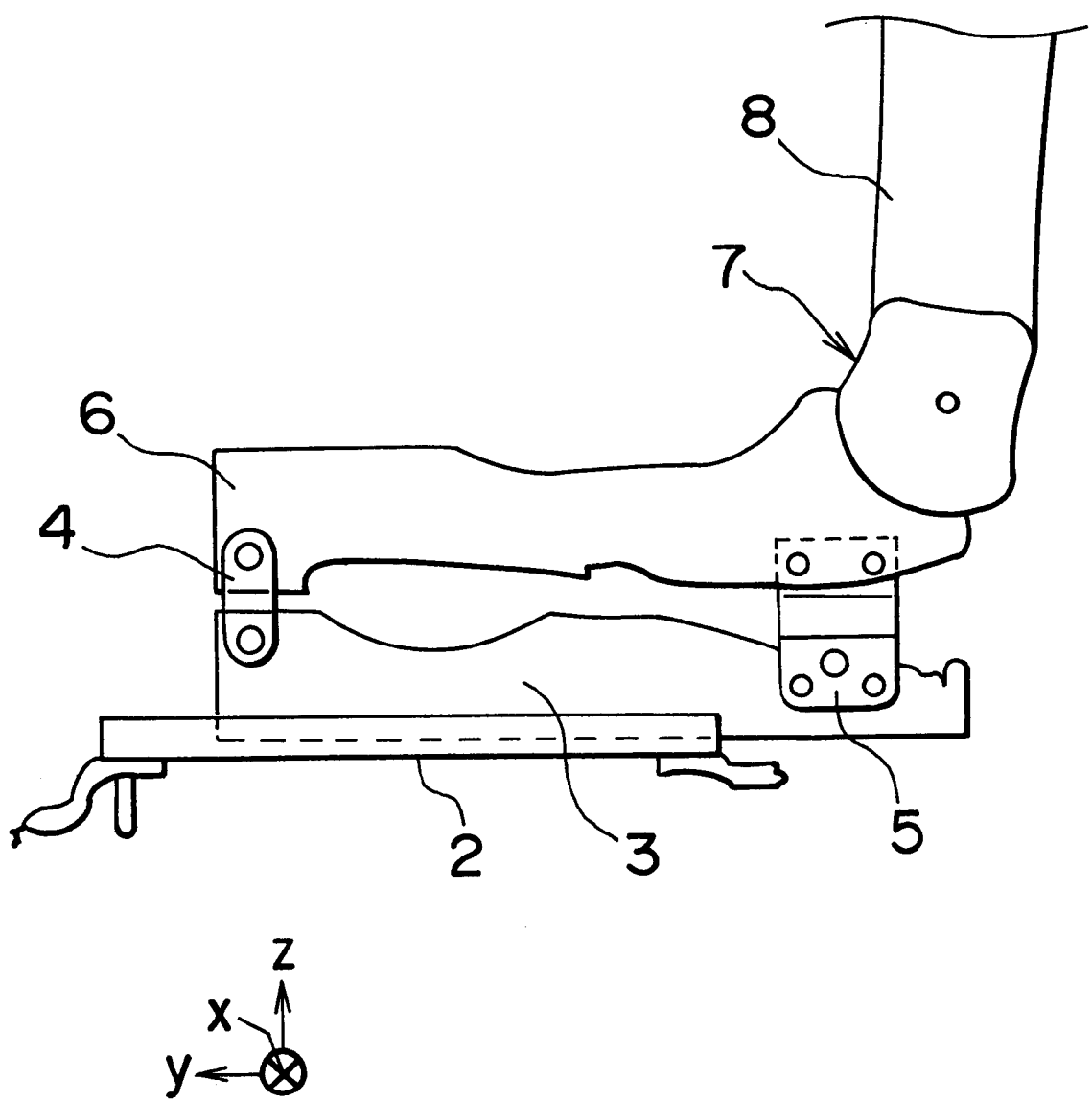
FIG. 2 is a front view of a front bracket and a rear bracket according to the first embodiment of the present invention for coupling a lower arm to support a seat cushion and a seat back of a seat shown in FIG. 1 with an upper rail.

As shown in FIG. 2, the lower arm 6, which supports the seat cushion 9 and the seat back 10 is coupled with the upper rail 3 by using a front bracket 4 and a rear bracket 5. A tilting mechanism 7 tiltably connects a frame 8 of the seat back 10 to the lower arm 6. Hereinafter, for example, as shown in FIG. 2, the front and back direction of the vehicle is represented by y, the width direction of the vehicle is represented by x, and the vertical direction of the vehicle is represented by z. In the drawings showing the front bracket 4 and the rear bracket 5, the respective directions are represented by "x", "y" and "z" when the front bracket 4 and the rear bracket 5 are attached to the seat SE.

Figure 3A:
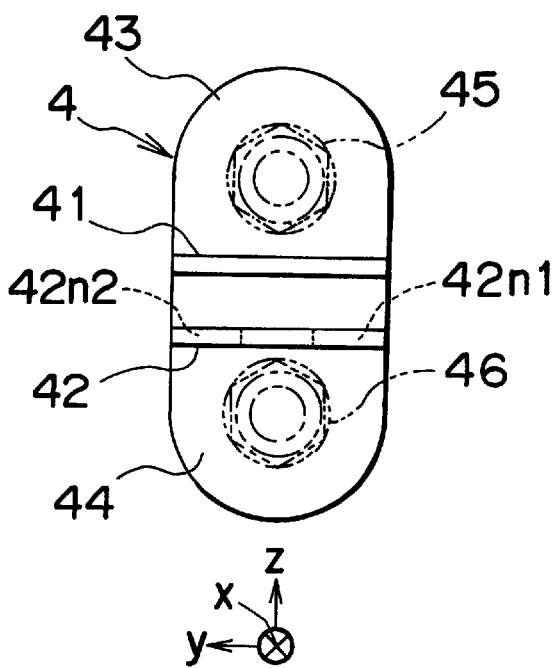
FIG. 3A is an enlarged front view of the front bracket shown in FIG. 2.
Figure 3B:
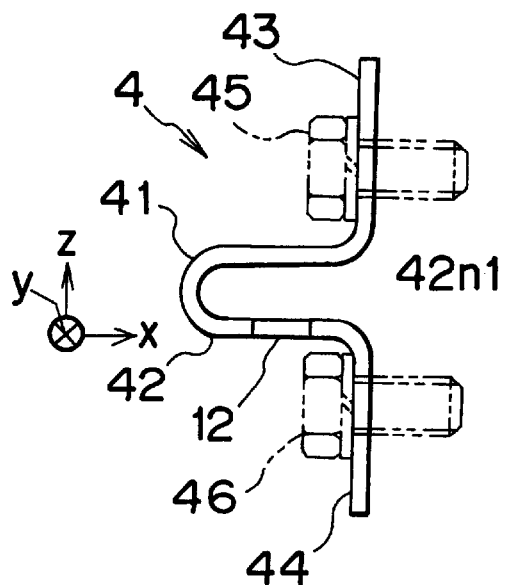
FIG. 3B is an enlarged right side view of the front bracket shown in FIG. 2.
Figure 3C:
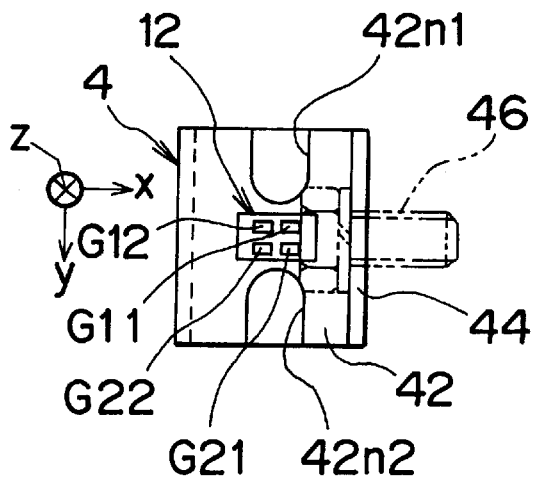
FIG. 3C is an enlarged bottom view of the front bracket shown in FIG. 2.

FIGS. 3A to 3C shows the front bracket 4. FIG. 3A is a front view of the front bracket 4, FIG. 3B is a right side view of the front bracket 4 and FIG. 3C is a bottom view of the front bracket 4. The front bracket 4 is made of a plate body, which is pressed into a convex shape such that of a U-shaped curved portion including legs 41 and 42 and end portions 43 and 44 perpendicular to the legs 41 and 42 are integrally connected. The leg 42 includes a pair of notches 42n1 and 42n2 for narrowing the width in the front and back direction y. Further, a distortion gage 12 is attached to the portion between these notches, i.e., a main portion of the leg 42. According to the present embodiment, with the distortion gage 12, four minute resistance lines (hereinafter, referred to as distortion detecting elements) G11, G12, G21 and G22, of which the resistance values vary according to distortion, are disposed between a laminate film and arranged at each corner of a rectangle on the same plane. As shown in FIG. 2, in a state in which the distortion gage 12 is attached to the front bracket 4, two of the distortion detecting elements are distributed in the width direction x and the other two distortion detecting elements are distributed in the front and back direction y. As a result, four distortion detecting elements in total are distributed on the x-y plane. An electric lead wire is not shown.

In the front bracket 4 shown in FIG. 3, bolts 45 and 46, which are put through facing rings, are inserted through holes of the end portions 43 and 44. These bolts 45 and 46 are then inserted through holes of the lower arm 6 and holes of the upper rail 3 to be put through the facing rings. Further, nuts are screwed onto the ends of male screws of the bolts 45 and 46. As a result, the shape obtained by coupling the upper rail 3 and the lower arm 6 with the front bracket 4 is as shown in FIG. 2.

FIGS. 4A to 4C show the rear bracket 5. FIG. 4A is a front view of the rear bracket 5, FIG. 4B is a right side view thereof, and FIG. 4C is a cross sectional view taken along line 4C—4C shown in FIG. 4B. The rear bracket 5 is made of a plate body, which is pressed into a S-shape such that a generally U-shaped curved portion including legs 51 and 52 and end portions 53 and 54 perpendicular to the legs 51 and 52 are integrally connected; and the end portions 53 and 54 are further provided with horizontal portions. The leg 51 includes a pair of notches 52n1 and 52n2 for narrowing the width in the front and back direction y. Further, a distortion gage 13 is attached to the portion between these notches, i.e., a main portion of the leg 51. Also, on the distortion gage 13, four minute resistance lines (hereinafter, referred to as distortion detecting elements) G11, G12, G21 and G22, of which the resistance values vary according to distortion, are disposed between a laminate film and arranged at each corner of a rectangle on the same plane. As shown in FIG. 2, in the state that the distortion gage 12 is attached to the rear bracket 5, two of the distortion detecting elements are distributed in the width direction x and other two of the distortion detecting elements are distributed in the front and back direction y. As a result, the four distortion detecting elements in total are distributed on the x-y plane.

In the rear bracket 5 shown in FIG. 4, two bolts 55 and 57, which are inserted through facing rings, are inserted through holes of the lower arm 6. Then, these bolts 55 and 57 are inserted through holes of the end portion 53 and the two bolts 56 and 58 in the end portion 54 are put through the facing rings to be put through holes of the end portion 54 and the holes of the upper rail 3. Further, these four bolts 55, 57, 56 and 58 are put through the facing rings and respective nuts are screwed onto the bolts 55, 57, 56 and 58. As a result, the shape obtained by coupling the upper rail 3 and the lower arm 6 with the front bracket 5 is as shown in FIG. 2.

The four distortion detecting elements G11, G12, G21 and G22 of the distortion gage 12 are connected each other in a Wheatstone bridge by an electric lead line, which is not illustrated here. The respective elements are disposed at each corner of a rectangle in electric connection. That is, one end of G11 and one end of G12 are connected to each other in series and the connecting point between one end of G11 and one end of G12 becomes a first output end. One end of G21 and one end of G22 are connected in series and the connecting point between them becomes a second output end. Meanwhile, the other end of G11 and the other end of G22 are connected to each other in series and the connecting point between them becomes a first input end. The other end of G12 and the other end of G21 are connected to each other in series and the connecting point between them becomes a second input end. When a direct current voltage Ev is applied between the first input end and the second input end, an output voltage between the first output end and the second output end, i.e., a distortion detecting voltage e can be obtained by the following expression.

$$e = Ev \cdot (G12 \cdot G22 - G11 \cdot G21) / [(G11+G12) \cdot (G21+G22)] \quad (1)$$

where G11–G22 represent resistance values of the distortion detecting elements G11–G22.

Figure 5A:
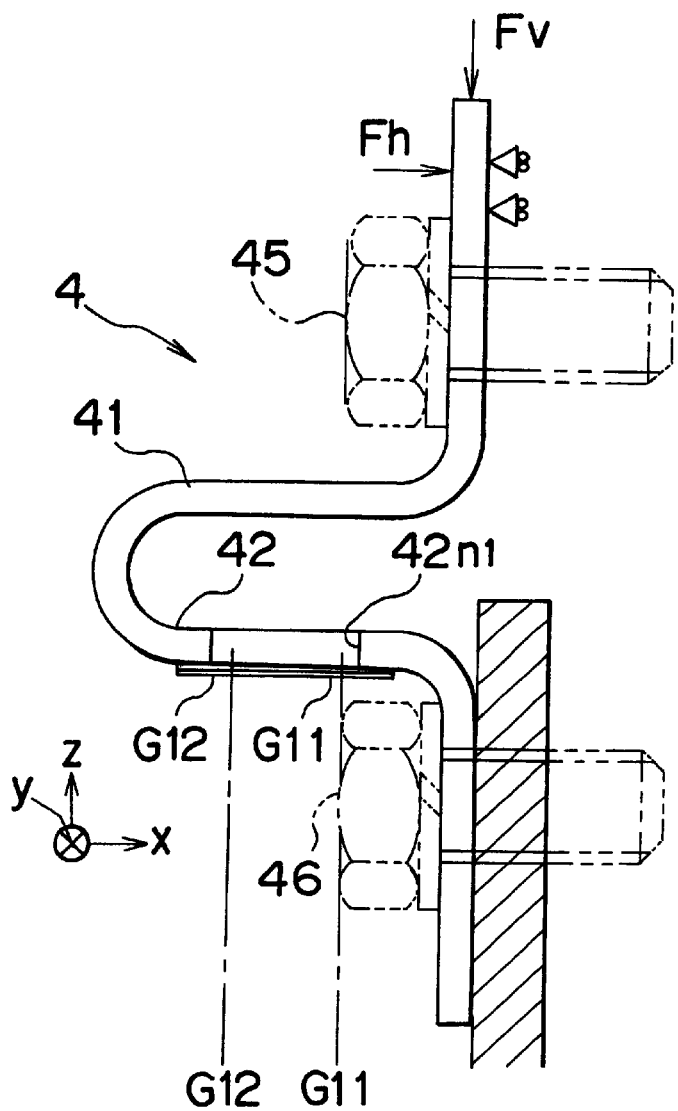
FIG. 5A is a further enlarged right side view of the front bracket shown in FIG. 3B.
Figure 5B:
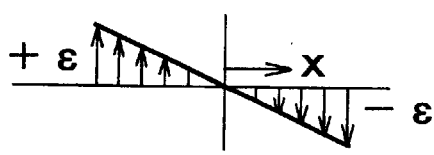
FIG. 5B is a graph showing a distribution in the x direction of the distortion applied to a leg when a vertical load Fv is applied to the front bracket.

FIG. 5A shows an enlarged front bracket 4 shown in FIG. 3B. When a vertical load Fv is applied to the front bracket 4, in the U-shaped leg 42 to which the distortion gage 12 is attached, distortions with different polarities are generated in opposite sides separated by substantially the center of the leg 42 in the x direction. Due to the generation of the different polarities, the resistance values G11 and G21 lower and the resistance values G12 and G22 rise. Therefore, the value of (G12·G22−G11·G21) in expression (1) has approximately twice the amount of change than does G11·G21. The respective values of (G11+G12) and (G21+G22) are substantially equal to the values when the vertical load Fv is not applied. Accordingly, the output voltage e, which is substantially proportionate to the vertical load Fv, is large relative to the amount of change of the vertical load Fv, i.e., a differential value with respect to Fv in the expression (1). That is, the sensitivity (gain) of the vertical load Fv detection is high.

Figure 5C:
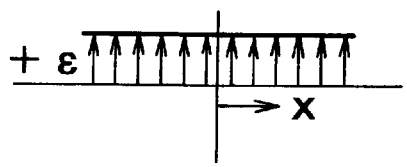
FIG. 5C is a graph showing a distribution in the x direction of the distortion applied to a leg when a horizontal load Fh is applied to the front bracket.

When a horizontal load Fh is applied to the bracket 4, substantially even distortion is generated in the leg 42 in the x direction of thereof as shown in FIG. 5C. Therefore, the value of (G12·G22−G11·G21) in the expression (1) does not change very much. The electric circuit is constructed and adjusted such that the value of (G12·G22−G11·G21) is substantially zero when no one is sitting in the seat, so that the load detecting voltage e changes substantially in response to the vertical load Fv but not in response to the horizontal load Fh. Therefore, the accuracy and stability of the seating load detection are high. A principle for detection of the seating load as described above is the same as that with respect to the rear bracket 5 (the distortion gage 13).

Figure 6A:
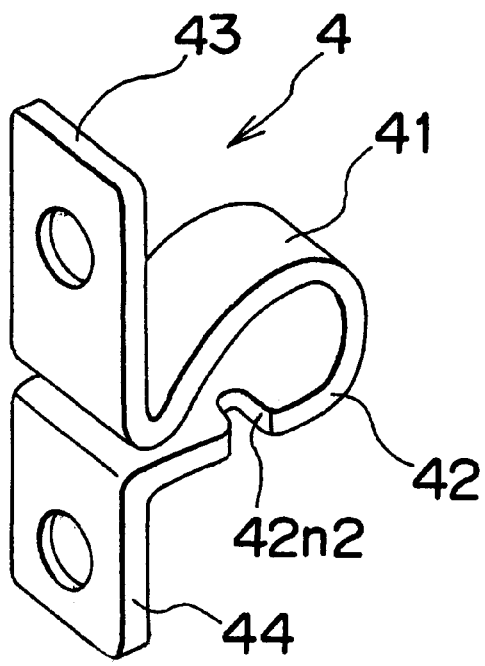
FIG. 6A is a perspective view showing an appearance of a modification of the front bracket.
Figure 6B:
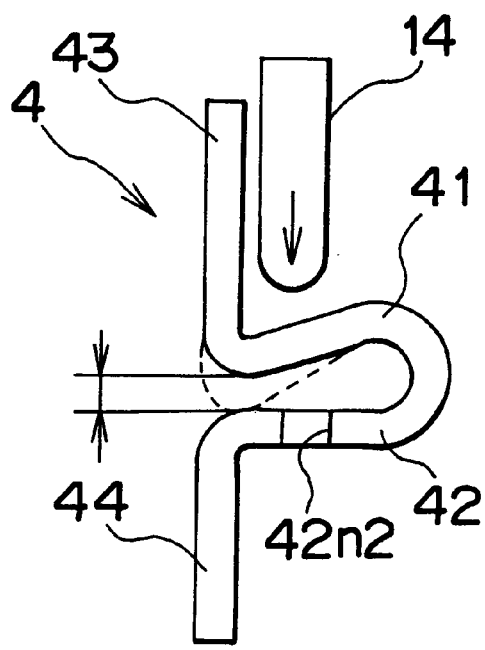
FIG. 6B is a side view of the front bracket shown in FIG. 6A, during shape adjustment machining before a distortion gage is attached thereto.

The brackets 4 and 5 are made thin to soften the springs, so that capability for absorbing a vertical impact improves and the sensitivity of the vertical load detection increases. However, excessive vertical impact may destroy the distortion gages 12 and 13, or change the detection property. In order to solve this problem by lowering the rigidity of the brackets 4, 5 and heightening sensitivity of the load detection, it is preferable that the width of the opening inlet in a U-shape be narrow as shown in FIG. 6A. Further, when an applied excessive vertical load exceeds the load detecting range, it is preferable that the lower end of the end portion 43 and the upper end of the end portion 44, that is, the opening inlet in a U-shape close so that a load larger than the load by which the opening inlet is closed is not applied to the two U-shaped legs.

The aforementioned structure can be relatively easily adjusted by forcibly lowering the leg 41 by a pre-load bar 14 and making the opening width a predetermined width by the spring back when an excessive load, which is applied at that time, is released. After adjustment is complete, attaching the distortion gage 12 prevents the distortion gage 12 from becoming damaged or deteriorated due to an excessive load.

In the meantime, as shown in FIG. 6A, if the sensitivity of the load detection is increased within a pre-established range of the load detection by narrowing the width of the opening inlet in a U-shape, the lower end of 43 and the upper end of 44 are contacted each other, i.e., the opening inlet in a U-shape is closed, when a person sits in the seat roughly or moving his or her body to get comfortable or just in fun. In this state, a person who sits in the seat feels as if the bottom of the seat crashes to the floor.

Figure 7A:
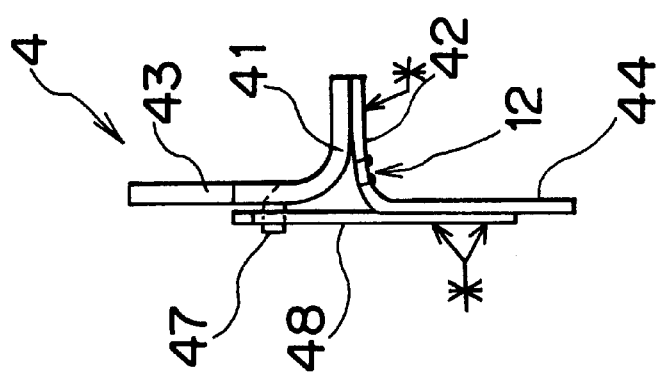
FIG. 7A is a perspective view showing a side of the front bracket according to a second embodiment of the present invention to be equipped with the distortion gage.
Figure 7B:
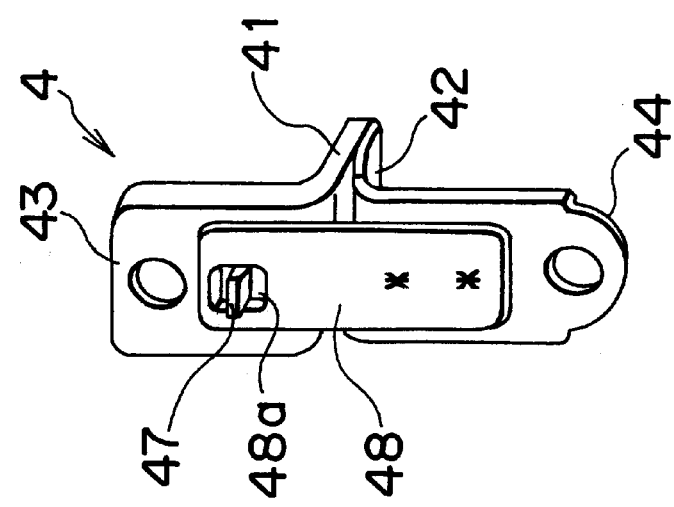
FIG. 7B is a perspective view showing a side of the front bracket according to the second embodiment of the present invention to be equipped with a force limiter.
Figure 7C:
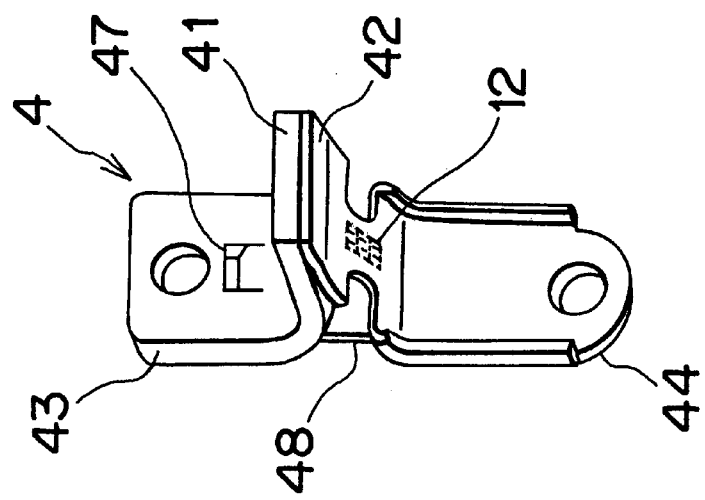
FIG. 7C is a side view of the front bracket according to the second embodiment of the present invention.
Figure 8B:
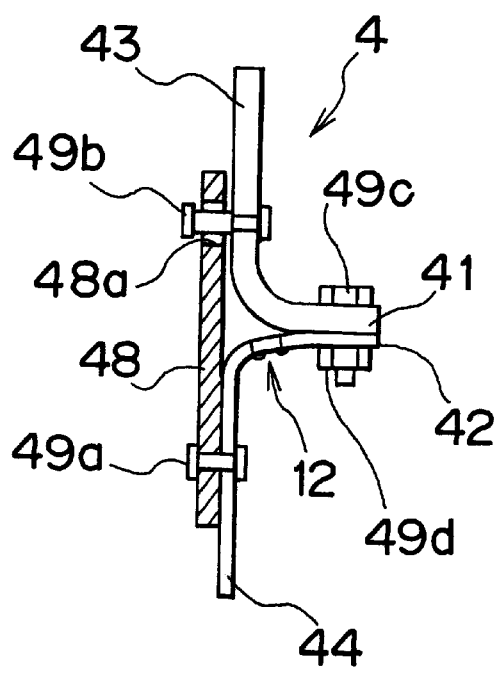
FIG. 8B is a side view of the front bracket shown in FIG. 8A with a vertical sectional view of the force limiter.
Figure 8A:
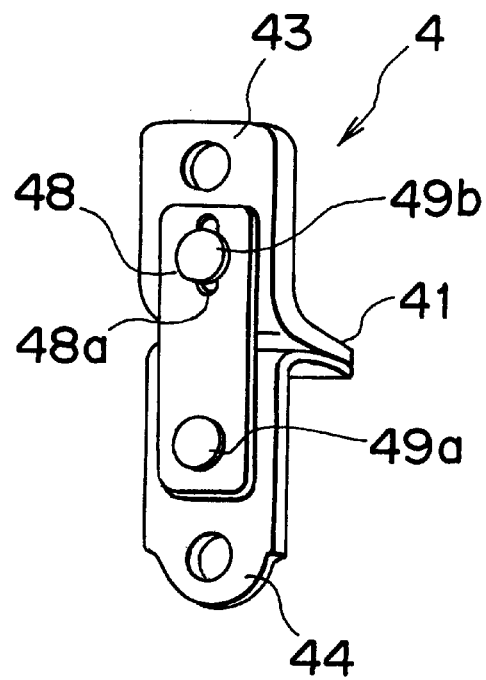
FIG. 8A is a perspective view showing a modification of the front bracket shown in FIGS. 7A to 7C.

This problem can be solved by obtaining the bracket 4 in the shape as shown in FIGS. 7 and 8, i.e., a V-shape with two angles back-to-back to secure the edges of the leg 41 and the leg 42 each other. Accordingly, the vertical load can be applied at the end portions 43 and 44. However, the bracket 4 in a generally V-shape is apt to change the shape thereof, for example, so as to be contorted about the vertical axis (z) or bent to push out the edges of the leg 41 and the leg 42, which are secured each other in the width direction x with the end portions 43 and 44 in a generally V-shape when an excessive load is applied thereto. In order to solve this problem, it is preferable that a force limiter 48 be provided so as to limit the amount of change of the seat within a predetermined range when an excessive load is applied, as shown in FIGS. 7A to 7C and FIGS. 8A and 8B.

As shown in FIGS. 7A to 7C, the edges of the two angled legs 41 and 42 are secured each other by spot welding. Meanwhile, one end of the force limiter 48 is secured to the angled end portion 44 by spot welding. On the other end of the force limiter 48, an opening 48a is defined to accept a stopper nail 47 protruded from the other angled end portion 43. The stopper nail 47 is slidable in the direction z within the width of the opening 48a in the direction z. According to the present embodiment, when an excessive vertical load is applied between the two angled end portions 43 and 44, the stopper nail 47 falls on a lower hem of the opening 48a on the force limiter 48. As a result, the force limiter 48 becomes one side of a triangle to reinforce the angle so that contortion and distortion are prevented. In this state, since bounce of the two angles against the vertical load just before the stopper nail 47 falls on the lower side of the opening 48a is large, the small change of the bounce against the vertical load is obtained when the stopper nail 47 falls on the lower side of the opening 48a. Therefore, a person who sits in the seat does not feel as if the bottom of the seat is crashing to the floor.

As shown in FIGS. 7A to 7C, if spot welding is applied between the two angled legs 41, 42 and between the force limiter 48 and the end portion 44, shape error or variation in the shape of the bracket 4 is easily generated by the spot welding between the two legs 41 and 42. Further, error or variation in the installation posture of the force limiter 48 is easily generated by the spot welding between the force limiter 48 and the end portion 44. These errors and variations bring about an error in seating load detection and deterioration of the detecting accuracy.

In view of this, it is preferable that the force limiter 48 be secured to one leg 42 and a pin 49b standing on the other leg 41 be guided to be slidable in the direction z in a long hole which is long in the direction z, such that the force limiter 48 is rotatable with respect to a pin 49a. However, the force limiter 48 should not be relatively slidable in direction z as shown in FIG. 8. Further, it is preferable that the bolt 49c be put through the legs 41 and 42 so as not to generate the distortion between these two legs, and a nut 49d screwed onto an end of the bolt 49c.

What is claimed is:

1. A seating load detecting device comprising:
   a seating load supporting member adapted to support a seat cushion and a seat back;
   a positioning member comprised of a guide rail adapted to be fixed to a floor and an upper rail slidably mounted on the guide rail;
   a bracket connecting the seating load supporting member to the upper rail of the positioning member to elastically transmit a load applied to said seating load supporting member to said positioning member;
   a curved portion provided on said bracket, having opposing portions between said positioning member and said seating load supporting member;
   a coupling portion which extends vertically from said respective opposing portions and which is coupled to said seating load supporting member and said positioning member; and
   a load sensor attached on a surface of said opposing portions.

2. A seating load detecting device according to claim 1, wherein the shape of said curved portion is either U-shaped or V-shaped, such that a space between opposing portions in said curved portion narrows as the amount of the seating load increases.

3. A seating load detecting device according to claim 1, wherein the space between opposing portions in said curved portion is adjusted so as to become narrower by applying a pre-load in the vertical direction.

4. A seating load detecting device according to claim 1, wherein said load sensor comprises a distortion gage.

5. A seating load detecting device comprising:
   a seating load supporting member adapted to support a seat cushion and a seat back;
   a positioning member comprised of a guide rail adapted to be fixed to a floor and an upper rail slidably mounted on the guide rail;
   a bracket connecting the seating load supporting member to the upper rail of the positioning member to elastically transmit a load applied to said seating load supporting member to said positioning member, said bracket including vertically spaced opposing portions;
   a load sensor provided on at least one of said opposing portions; and
   a limiting member, which is provided between said bracket or said seating load supporting member and said positioning member, for limiting a moving amount in the vertical direction of said seating load supporting member, when a load acts on said seating load supporting member.

6. A seating load detecting device according to claim 5, wherein said limiting member is provided with a long hole in the vertical direction and said limiting member is fixed to either said positioning member or said seating load supporting member, and a protrusion which is movable within said long hole is provided on the other, such that vertical movement of said seating load supporting member is limited by the long hole.

7. A seating load detecting device according to claim 5, wherein said load sensor comprises a distortion gage.

8. A seating load detecting device according to claim 2, wherein the space between opposing portions in said curved portion is adjusted so as to become narrower by applying a pre-load in the vertical direction.

9. A seating load detecting device according to claim 2, wherein the load sensor comprises a distortion gage.

10. A seating load detecting device according to claim 3, wherein the load sensor comprises a distortion gage.

11. A seating load detecting device according to claim 1, wherein said opposing portions are positioned to be spaced from each other in a vertical direction.

12. A seating load detecting device according to claim 2, wherein said opposing portions are positioned to be spaced from each other in a vertical direction.

13. A seating load detecting device according to claim 3, wherein said opposing portions are positioned to be spaced from each other in a vertical direction.

14. A seating load detecting device according to claim 4, wherein said opposing portions are positioned to be spaced from each other in a vertical direction.

15. A seating load detecting device according to claim 6, wherein said load sensor comprises a distortion gage.

16. A seating load detecting device comprising:
   a seating load supporting member adapted to support a seat cushion and a seat back;
   a positioning member comprised of a guide rail adapted to be fixed to a floor and an upper rail slidably mounted on the guide rail;
   a bracket connecting the seating load supporting member to the upper rail of the positioning member to elastically transmit a load applied to said seating load supporting member to said positioning member;
   a U-shaped or V-shaped portion provided on said bracket and having opposing portions between said positioning member and said seating load supporting member;
   a coupling portion which extends vertically from said respective opposing portions and which is coupled to said seating load supporting member and said positioning member; and
   a load sensor attached on a surface of said opposing portions.

17. A seating load detecting device according to claim 16, wherein the space between the opposing portions in said U-shaped or V-shaped portion is adjusted so as to become narrower by applying a pre-load in the vertical direction.

18. A seating load detecting device according to claim 16, wherein the load sensor comprises a distortion gage.

19. A seating load detecting device according to claim 16, wherein a limiting member is provided between said bracket or said seating load supporting member and said positioning member, for limiting a moving amount in the vertical direction of said seating load supporting member.

20. A seating load detecting device according to claim 19, wherein said limiting member is provided with a long hole in the vertical direction and said limiting member is fixed to either said positioning member or said seating load supporting member, and a protrusion which is movable within said long hole is provided on the other of said positioning member or said seating load supporting member, such that vertical movement of said seating load supporting member is limited by the long hole.

21. A seating load detecting device according to claim 19, wherein said load sensor comprises a distortion gage.

* * * * *